Feb. 2, 1971 R. G. ROGERS 3,560,883

FREQUENCY CONTROL OF A MICROWAVE DEVICE USING A TRANSMISSION LINE AS A FREQUENCY DETERMINING ELEMENT

Filed Aug. 13, 1968 8 Sheets-Sheet 1

INVENTOR.
ROBERT G. ROGERS

BY Spencer E. Olson

ATTY.

Feb. 2, 1971 R. G. ROGERS 3,560,883

FREQUENCY CONTROL OF A MICROWAVE DEVICE USING A TRANSMISSION LINE AS A FREQUENCY DETERMINING ELEMENT

Filed Aug. 13, 1968 8 Sheets-Sheet 4

3,560,883

FREQUENCY CONTROL OF A MICROWAVE DEVICE USING A TRANSMISSION LINE AS A FREQUENCY DETERMINING ELEMENT

Robert G. Rogers, Los Altos, Calif., assignor to Automatic Electric Laboratories, Inc., Northlake, Ill., a corporation of Delaware

Filed Aug. 13, 1968, Ser. No. 752,339
Int. Cl. H03b *7/14;* H03c *3/22*
U.S. Cl. 332—16 18 Claims

ABSTRACT OF THE DISCLOSURE

A transistorized microwave oscillator having a distributed constant transmission line as its primary frequency determining element, is electrically tuned by varying the resistance of at least one variable conductance device positioned near a voltage null on the transmission line. The disclosed null tuning has particular application in oscillators because of its capability of producing substantially linear frequency modulation, but may be used in other applications, for example in electrically tuned filters, in which it is desired to vary as a function of signal voltage or current the reactance of a length of transmission line.

BACKGROUND OF THE INVENTION

Field of the invention

This invention relates generally to high frequency oscillators, and more particularly to microwave transistor oscillators which use a section of transmission line to determine its frequency of operation. In a more specific sense, the invention relates to apparatus for electrically tuning a distributed constant frequency determining transmission line.

Description of the prior art

It has long been known to use resonator structures of various types, including sections of transmission line, as the frequency determining element in an ultra-high frequency oscillator. Before the advent of semiconductors, vacuum tubes were of a design to be incorporated into and form a part of the resonant structure. As transistors became available, resonator structures have been designed to accommodate them in place of the tube as the active element, and with the development of microwave transistors it has become possible to develop solid state tuned microwave transistor oscillators with octave bandwith, the varactor being the favorite tuning element. Such voltage tunable oscillators, of which one design is analyzed in the article entitled, "Microwave Varactor Tuned Transistor Oscillator Design," appearing on page 564 of I.E.E.E. Transactions, volume MTT–14, No. 11, November 1966, are beginning to replace backward wave oscillators and klystrons in a number of applications.

In general, such transistorized microwave oscillators use a section of transmission line, open- or short-circuited at the far end, in either coaxial or strip line geometry, to determine the frequency of oscillation. The line section may be in the collector circuit and also serve to match the impedance of the oscillator to the load, or it may be in the base or emitter circuit with a separate collector circuit provided for impedance matching. The length of the line is chosen so as to present a low, usually inductive reactance to the transistor at the operating frequency; the line length and reactance required to match the transistor determines the operating frequency. Normally, the line is slightly longer than a quarter wavelength, open-circuited at the far end, and has low loss so as to give maximum stability and purity to the output energy.

Placing a voltage sensitive capacitor (varactor) across the transmission line at or near a voltage maximum along the line changes the electrical length of the line and enables electrical tuning or frequency modulation of the oscillator. Although the varactor gives wide tuning ranges, tuning linearity is poor due to the nature of the device. Moreover, because it is a voltage sensitive capacitor, any ripple, drift or other amplitude modulation of the microwave energy on the line causes the oscillator to frequency modulate itself with these extraneous signals.

Varactor controlled oscillators also require exercise of care to insure that the peak-to-peak radio frequency voltage swing across the varactor is small compared to the D.C. bias voltage. A large swing will give nonlinear frequency deviation; i.e., the frequency swing will be greater in one direction than the other.

Coupled with the foregoing problems is the need for relatively large D.C. voltage to effect varactor tuning, with the attendant requirement for special transistors and power supplies in the tuning (or modulation) drive circuits. For these reasons a varactor is unacceptable as a tuning element in many applications.

Therefore, it is a primary object of the present invention to provide an improved frequency control for a microwave transistor oscillator or other device utilizing a transmission line section as a frequency determining element.

Another object is to provide a microwave frequency oscillator capable of relatively linear frequency modulation over a useful range.

SUMMARY OF THE INVENTION

Briefly, the oscillator according to the invention includes a section of transmission line (coaxial line in the preferred embodiment) one or more quarter wavelengths long at the frequency of operation, and either short-circuited or open-circuited at one end. A microwave transistor positioned within the transmission line near the other end has one of its electrodes directly connected to the inner conductor and through an RF choke to the outer conductor of the line. A second electrode of the transistor is connected to a source of operating potential and the third electrode is connected to an output circuit. The apparatus thus far described when suitably energized produces oscillations at a frequency determined by the parameters of the circuit, including the length of the line, and gives rise to a standing wave pattern of voltage maximums and minimums (nulls) on the line characteristic of oscillators of this type.

Electrical tuning of the oscillator is achieved by connecting at least one variable resistance device to the inner conductor of the line at a position slightly removed from a voltage null of the standing wave pattern. The variable resistance device preferably takes the form of a semiconductor diode having such junction characteristics that it appears as a good diode at baseband frequencies but ceases to exhibit its usual rectification properties at frequencies above the operation frequency of the oscillator, and of changing resistance in response to variations in the magnitude of current flowing through the diode. It has been discovered that a number of now available diodes, such as PIN and "snap" diodes, exhibit these characteristics to a sufficient degree to be useful for this purpose. As the current through the diode is varied by a suitable drive circuit, the reactance and therefore the effective electrical length of the line section, is correspondingly varied to thereby change the frequency of operation. With diodes now available, which do not have optimum characteristics for the herein disclosed application, it is possible to achieve quite linear tuning over a range of about 20 megacycles at an operating frequency of 2000 megacycles.

BRIEF DESCRIPTION OF THE DRAWINGS

Further objects and advantages of the invention will become evident and a better understanding of its construction and operation will be had from the following detailed description and the accompanying drawings, in which.

PRINCIPLES OF OPERATION

Figure 1:
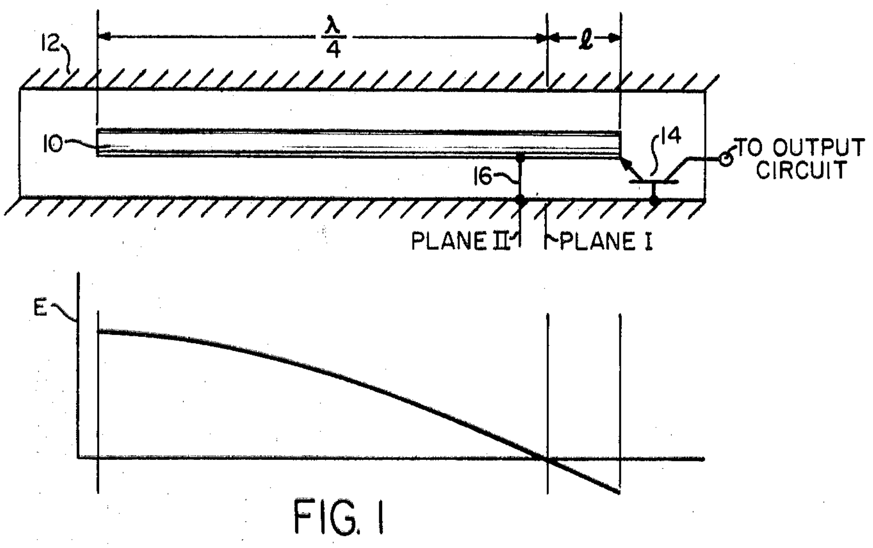
FIG. 1 is a schematic representation of a portion of a transistorized oscillator useful in explaining the principles of the invention.

While the invention has applicabiilty in a variety of tuning situations, the theory of its operation will be described in connection with a transistorized transmission line oscillator, the essentials of which are schematically presented in FIG. 1. Essentially, the oscillator consists of a section of open-circuited coaxial transmission line of a length slightly longer than a quarter wavelength having an inner conductor 10 and an outer conductor 12. The line is shown connected in the emitter-base circuit of a transistor 14. The output of the transistor is taken from the collector electrode through suitable circuitry (not shown) to the load. For clarity at this stage of the description, the necessary potentials for operation of the oscillator likewise are not shown.

As will be observed from the standing wave pattern, shown alongside the transmission line, when the oscillator is in operation an impedance maximum (and voltage minimum) occurs on the line at a plane I, the position of which is determined by the choice of line length and the characteristics of the transistor. A short circuit may be placed on the line at plane I without changing oscillator performance, if, of course, the short circuiting line has such an area in plane I as not to inhibit transmission line mutual coupling on either side of it by any material amount. If, however, the line is shorted in plane II, slightly removed from the null at plane I, by a shorting line 16, transistor 14 will "see" a change in the impedance of the transmission line so as to increase the frequency of oscillation. While the short at plane II changes the frequency, it does not afford any tuning capability. In accordance with the present invention a shunt conductance, capable of being electrically tuned, is connected across the line in place of short circuit 16.

Figure 2:
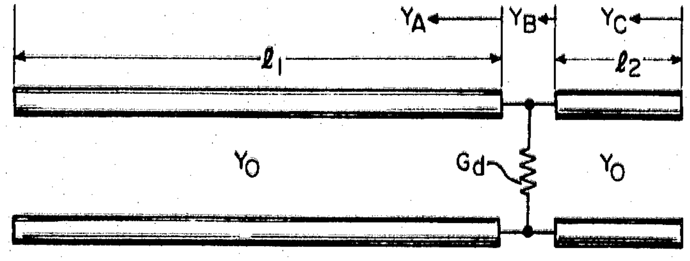
FIG. 2 is a stylized representation of a transmission line.

Referring to FIG. 2, a transmission line of characteristic admittance $Y_O$ is shown in a stylized manner, with the shunt conductance represented by $G_d$. While equations for $Y_A$, $Y_B$ and $Y_C$ could be written as a function of $G_d$, the operation is more understandable if reference is made to the Smith Chart shown in FIG. 3 in the admittance plane. Due to the transformation of an open-circuit along the line of fractional wavelength $l_1/\lambda$, $Y_A/Y_O$ will be a pure susceptance. Consequently, point A is $Y_A/Y_O$ (or more accurately, its susceptance is $B_A/Y_O$) and is also $Y_B/Y_O$ when $G_d=0$, since from FIG. 2:

$$\frac{Y_B}{Y_O}=\frac{G_d}{Y_O}+\frac{Y_A}{Y_O}=\frac{G_d}{Y_O}+j\frac{B_A}{Y_O}$$

with $G_d$ being the controlling or "tuning" conductance across the line. As $G_d/Y_O$ is increased, $Y_B/Y_O$ will go from point A to point B and so on around the constant susceptance circle arc to point C when $G_d/Y_O\rightarrow\infty$. The line of length $l_2$ transforms the circle arc, rotated by an electrical distance $l_2/\lambda$, to the arc A'B'C'.

Showing ABC as an arc on the constant susceptance curve which starts at A (when $G_d=0$) is not quite accurate, at least in the case of a transistor oscillator, since as $G_d$ increases, going from A to B to C, and hence also from A' to B' to C', frequency increases also. But this frequency change is only of the order of 1 to 2%, so $l_1/\lambda$ and $l_2/\lambda$ are varying to that degree. This is too small a change to show on the Smith Chart. Further, it is not this electrical change due to frequency variation that is causing susceptance, and hence frequency change, in the oscillator. On the contrary, it is the change in susceptance caused by variation of $G_d$ that causes frequency change.

Figure 5:
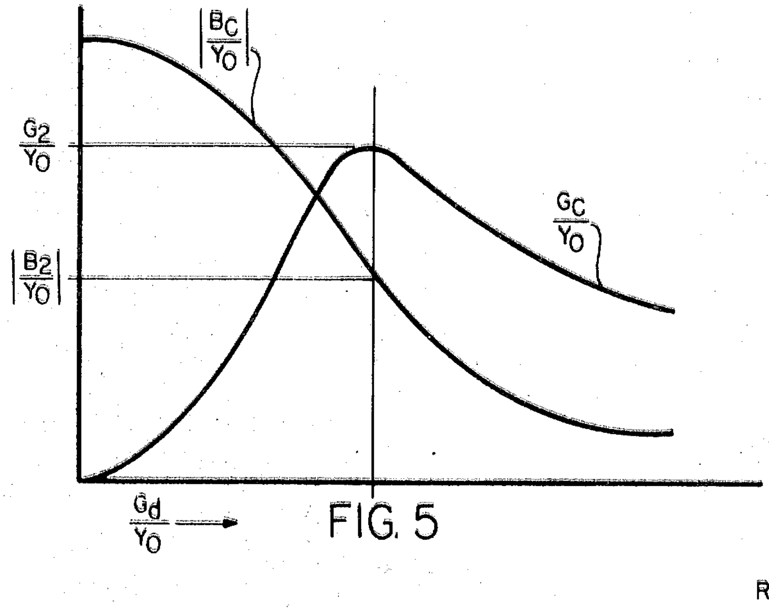
FIG. 5 is a plot of susceptance and conductance useful in explaining the operation of the invention.

For purposes of the present invention, the region of interest is for low values of $G_d$, between A' and B'. Referring to the expansion of region A'–B' shown in FIG. 4, there is a point B' on the admittance curve $Y_C/Y_O$ which is tangent to a constant conductance curve, which also is the maximum value of conductance which $Y_C/Y_O$ will take on. Due to coordinate orthogonality, point B' is also in the region where the susceptance $Y_C/Y_O$ has its maximum rate of change with $G_d$. A graph of $G_C/Y_O$ and $|B_C/Y_O|$ is shown in FIG. 5. Here $G_C/Y_O$ peaks (to the value $G_2/Y_O$) at the inflection point $|B_2/Y_O|$ of $|B_C/Y_O|$. This is the desired operating region of the circuit. In the example given the susceptance is really negative.

In the foregoing discussion and Smith Chart analysis an idealized shunt conductance, $G_d$, has been assumed. However, it will be seen from the discussion to follow that practical realizations of $G_d$ do not provide as wide a turning range as FIGS. 3 and 4 would indicate. Among the devices which have been considered to provide the controllable $G_d$ is the PIN diode, a semiconductor device having positively and negatively doped portions and an intrinsic region between the P-N junction. It has been discovered that at the lower frequencies the PIN diode acts as a good diode, with the result that when an A.C. signal is superimposed on a D.C. forward bias, the diode resistance changes with the time-varying function. However, above a certain threshold frequency, of the order of 10 mc. for most PIN diodes now available, the voltage variation is too rapid to cause any appreciable charge migration in and out of the intrinsic region. Thus, at microwave frequencies the diode appears as a resistance (of a different value than the low frequency resistance) which cannot vary with the microwave energy but is controlled only by applied signals or bias at frequencies below the threshold frequency.

Figure 6:
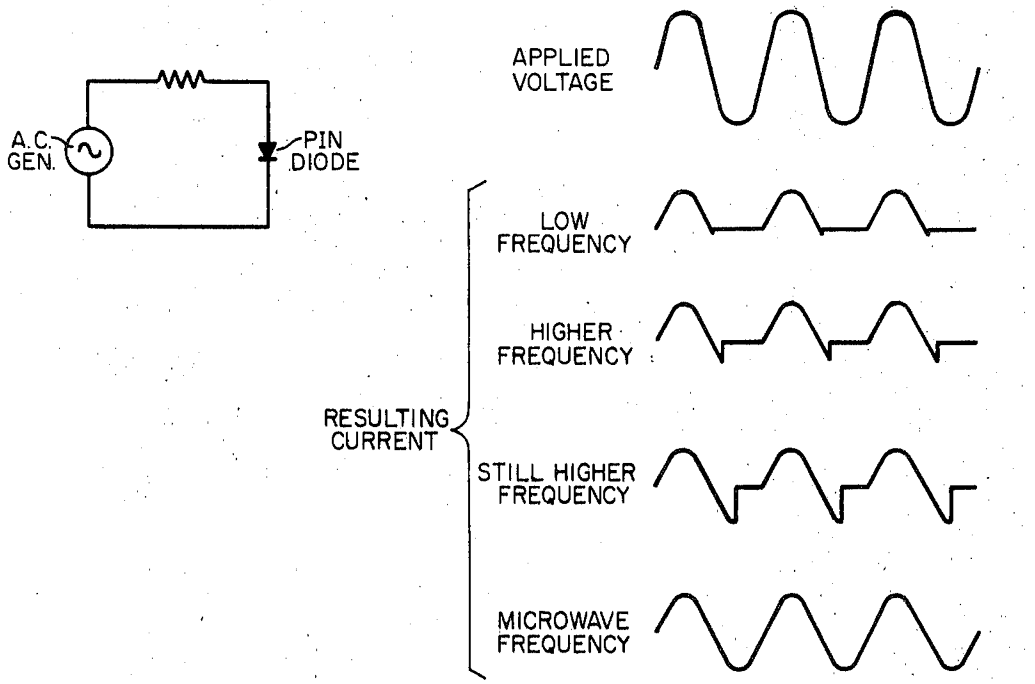
FIG. 6 is a series of waveforms illustrating the rectification properties of a PIN diode at different frequencies.
Figure 7:
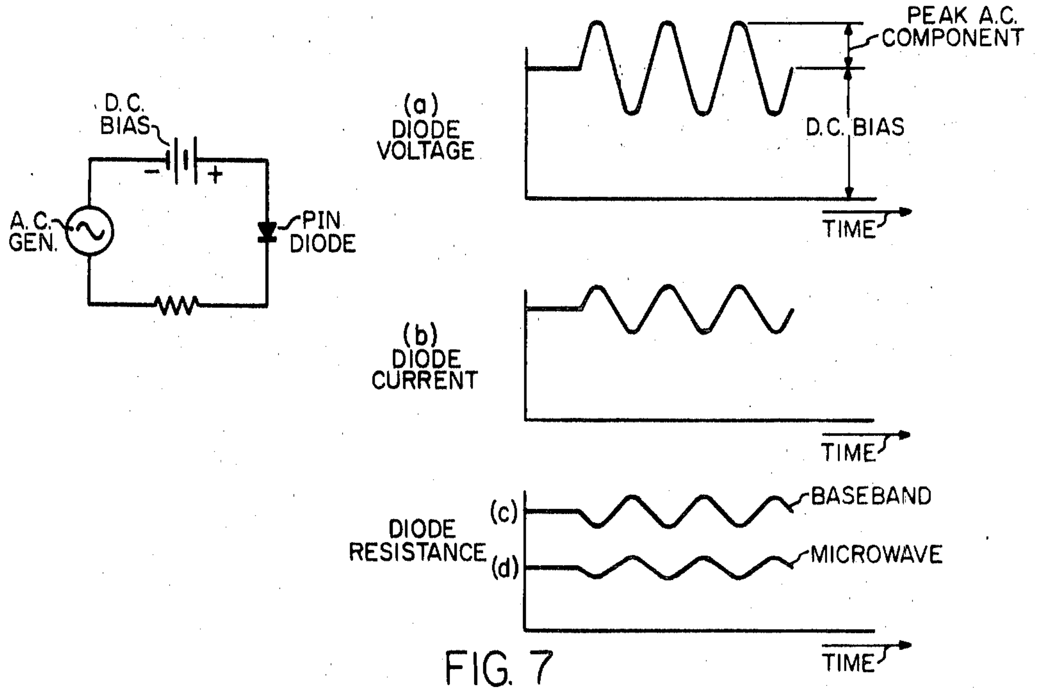
FIG. 7 is a series of waveforms illustrating the current and resistance characteristics of a biased PIN diode to which a modulating signal is applied.

This essential dual role of the diode in the successful modulation of an oscillator will be seen more clearly from FIGS. 6 and 7. If, as shown in FIG. 6, a sine wave voltage is applied to a PIN diode, the waveform of the current through the diode is dependent on the frequency of the applied signal. At very low frequencies, half wave rectification, characteristic of diodes, occurs. At higher frequencies, as shown in the third and fourth waveforms, reversal of voltage causes reversal of current for only a fraction of the half cycle. This phenomenon occurs because during forward conduction minority carriers are produced in the intrinsic semiconductor region. Upon reversal of applied voltage the charge storage represented by the minority carriers must be swept out by the reversed electric field, and until these carriers have been removed the diode continues to conduct. The length of time required to sweep out these charges is called the "minority carrier lifetime." When all of the charges have been removed the diode current drops to zero. This is the current "snap" of the snap or step-recovery diode, which is also a form of PIN junction.

At frequencies above the reciprocal of the minority carrier lifetime, the device ceases to act as a diode but instead behaves as a resistance, the value of which may be varied by applied voltages at frequencies below the critical or threshold frequency. Above the threshold frequency, the diode resistance is lower than the value determined by the voltage applied below threshold cutoff, but varies proportionally to the "low frequency" resistance. All diodes exhibit this effect to some degree; the PIN and snap diodes have been specifically designed to take advantage of this phenomenon, whereas microwave detector diodes such as the Schottky diode, have been designed to minimize this "snapping," even at high microwave frequencies.

Even though diodes of this type when employed as a tuning element are operated with a fixed D.C. bias, and are never swung through zero voltage, the charge storage phenomenon causes them to be less effective at baseband modulating frequencies which approach the threshold frequency, resulting in a drooping baseband response. Accordingly, the minority carrier lifetime of the diode must be high enough to prevent appreciable droop, yet the diode must be capable of operating above the threshold frequency of the microwave energy generated by the oscillator. The schematic circuit and waveforms of FIG. 7 illustrate the operation of the diode in an oscillator under the normal condition of a D.C. bias added to the modulating signal. The A.C. modulating signal is at baseband frequency, causing the total diode voltage to vary as shown in curve (a); the resulting current through the diode is shown in curve (b). Since the modulating frequency is low compared to the diode threshold or cutoff frequency, the minority carriers can move fast enough to instantaneously follow the variations in applied voltage, so the resulting current is proportional to applied voltage. If a small A.C. component is assumed, the diode resistance will vary exactly proportional to applied voltage as shown in curve (c). However, the microwave voltage appearing across the diode alternates so fast compared to the ability of the minority carriers to follow that there is no appreciable change in minority charge in the intrinsic region and the diode resistance does not vary at the microwave frequency rate. However, the relatively slowly varying charges, being influenced by the baseband frequency below cutoff, do cause the resistance seen by the microwave energy to vary proportional to the modulating baseband frequency as illustrated in curve (d). Thus, at microwave frequencies the diode appears as a resistance (of a value lower than the low frequency resistance) which cannot vary with the microwave energy, but is controlled only by signals (or bias) at frequencies below the threshold frequency. Thus, the diode affords the electrically tunable $G_d$ in the schematic diagram of FIG. 2.

DESCRIPTION OF A PREFERRED EMBODIMENT

Figures 8, 10:
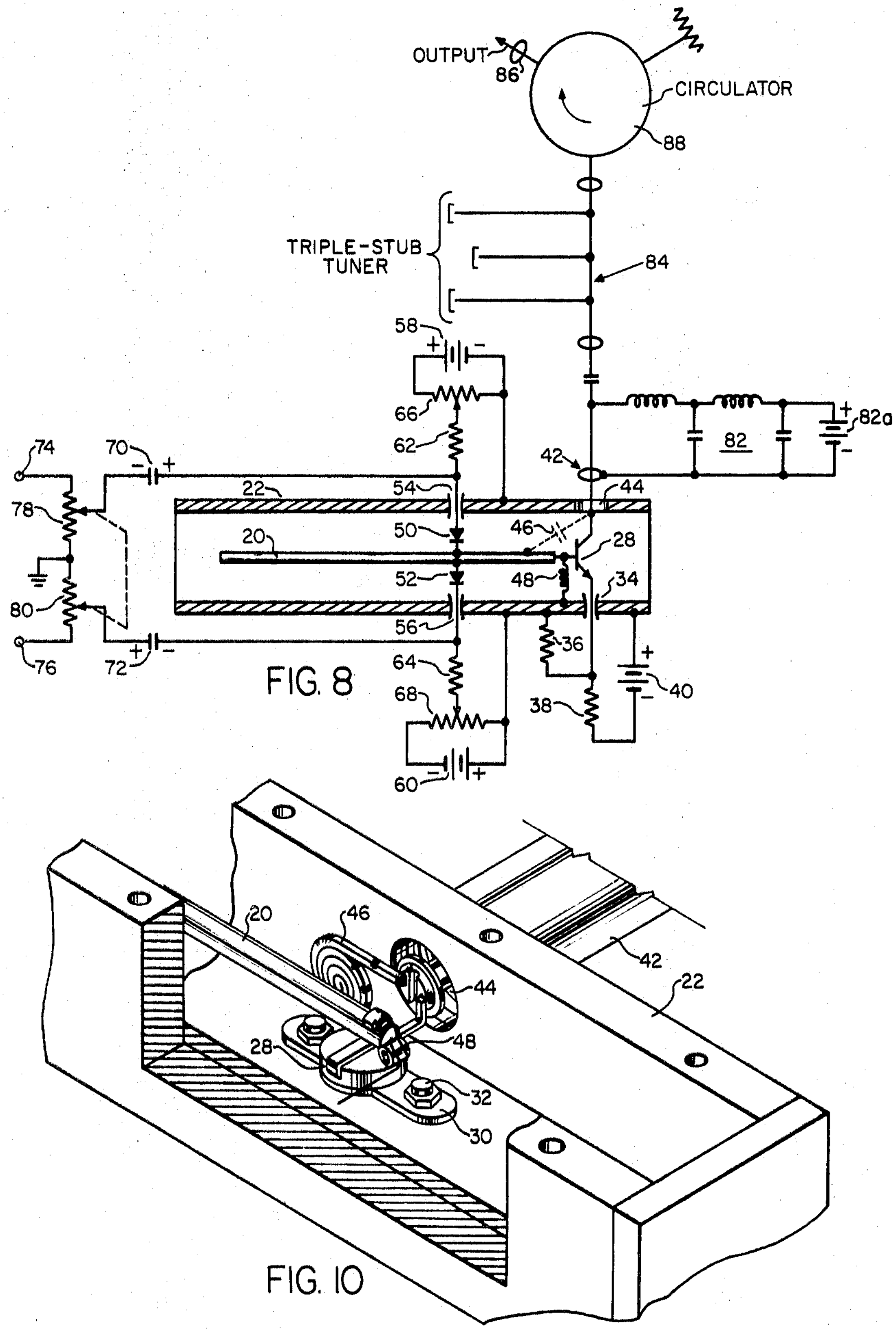
FIG. 8 is a schematic diagram of an oscillator circuit embodying the invention.
FIG. 10 is an enlarged fragmentary view of the right end of the oscillator of FIG. 9.
Figure 9:
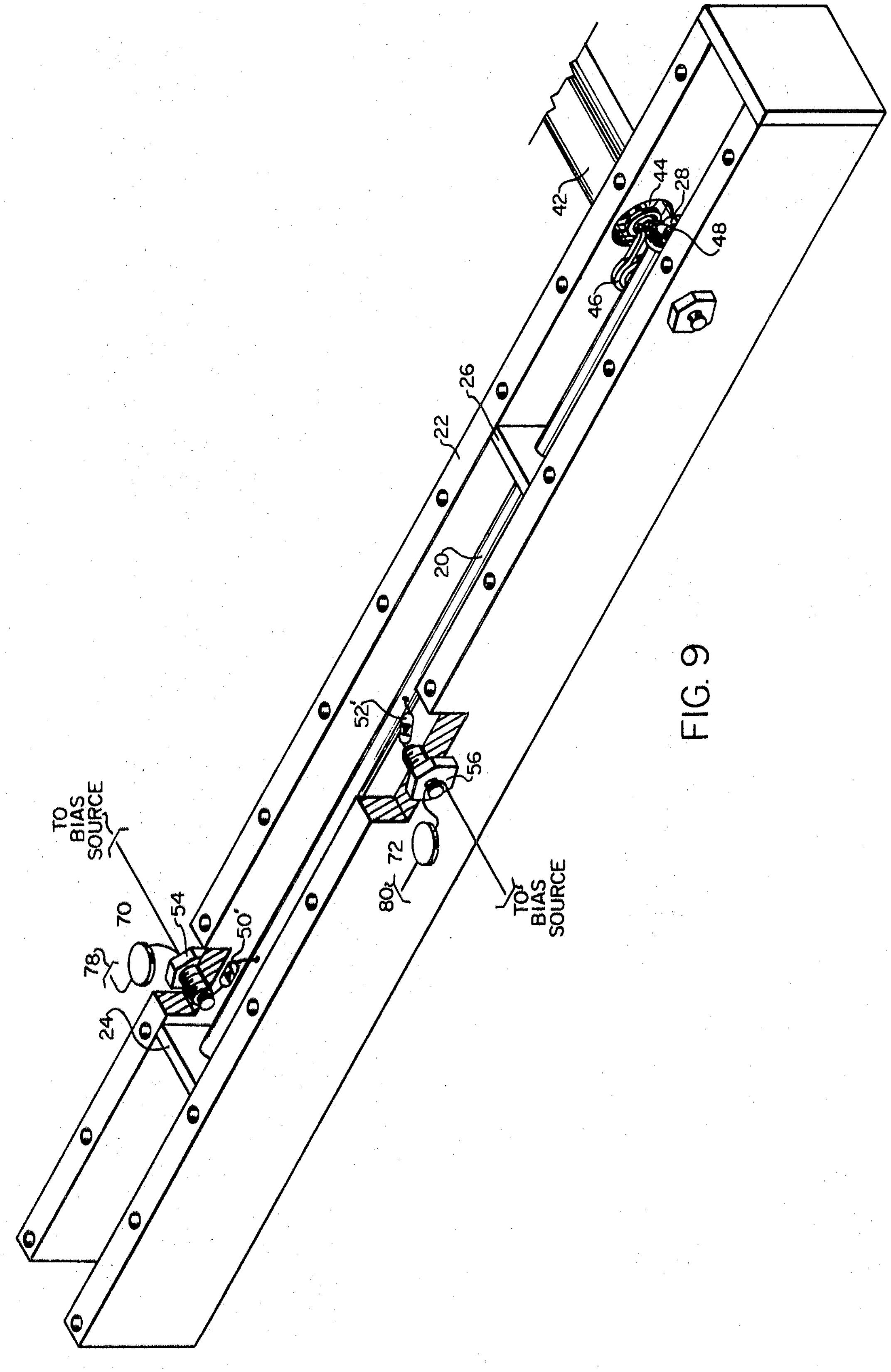
FIG. 9 is a perspective view of a transmission line oscillator embodying the invention, with a portion of the outer conductor of the transmission line removed to reveal the arrangement of the active elements of the oscillator.

Leaving for later discussion the practical limitations of available diodes in achieving the phenomenon just described, the application of the principles of the invention in a modulated microwave transistor oscillator will now be described. The oscillator and associated accessory equipment are schematically illustrated in FIG. 8, and a physical implementation is shown in FIGS. 9 and 10; corresponding parts in the three figures are identified with like reference numerals.

The primary frequency determining element of the oscillator is a section of coaxial transmission line having a rodlike inner conductor 20 and an outer conductor 22 of rectanular cross section, one side wall of which is a removable plate to facilitate assembly and adjustment of components mounted inside the line. The plate is removed in FIG. 9 to reveal the location of the components mounted therein. In one model of the oscillator which has been successfully operated, the inner conductor is a round rod ⅛ inch in diameter and the outer conductor is of square cross section, $\frac{9}{16}$ inch on the side. The inner conductor is centrally supported within the outer conductor by a pair of dielectric spacers 24 and 26. In general, the line dimensions are chosen to give a desired characteristic impedance, in the case of this oscillator, 77 ohms. The line is open-circuited at one end and preferably is at least three half wavelengths long at the frequency of operation, for reasons which will appear later.

The active element of the oscillator is a transistor 28 mounted inside the outer conductor of the line section at the end opposite the open-circuit. In the illustrated embodiment, a TRW 2N4976 transistor is used, its stud package being bolted to the wall of the outer conductor 22 opposite the cover. This type of package has a pair of tabs connected to the emitter electrode of the transistor, one of which is visible at 30 in FIG. 10. Apertures in each of the tabs are held by studs soldered to .001 microfarad feedthrough capacitors mounted on each side of the transistor stud in the wall of the outer conductor. One end of one of the studs is visible at 32 in FIG. 10. Only one of these feedthrough capacitors is shown at 34 in the schematic diagram of FIG. 8. External of the outer conductor (not visible in FIG. 10) a 30-ohm resistor 36 (FIG. 8) is connected from the lead of one of the feedthrough capacitors to the grounded outer conductor, and from the same lead a 100-ohm series emitter resistor 38 (FIG. 8) is connected to a source 40 of bias potential, the positive terminal of which is grounded to the outer conductor of the line section.

The output from the oscillator is derived from the collector electrode and is coupled to external circuitry via a section of 50-ohm coaxial line 42, the outer conductor of which is threaded into an opening 44 in one side wall of the outer conductor 22. The collector lead of transistor 28 is soldered to a screw inserted into the inner end of the inner conductor. The base electrode of the transistor is soldered to the end of inner conductor 20, and collector-to-base feedback capacitance is provided by a length of relatively stiff wire 46 wound in a spiral, one end of which is soldered to the collector lead and the spiral lying close to the inner conductor 20. The inner conductor 20 is connected for D.C. to the outer conductor 22 by a radio frequency choke 48 which, in the illustrated embodiment, consists of about two turns of fine wire wound on a Mylar tube about ⅛ inch in diameter and ⅛ inch long.

The circuit thus far described is similar in operation to known transistorized transmission line oscillators in that the frequency of operation is primarily determined by the parameters of the resonant line. When a resonant open-circuited line is used (as here) the minimum line length is slightly longer than a quarter wavelength, and for the application of diodes as tuning elements in accordance with this invention, is preferably an integral multiple of half wavelengths longer than a quarter wavelength. What impedance the line presents to the transistor is difficult to calculate and even more difficult to measure, since the parameters of the transistor while oscillating are not the same as a nonoscillating transistor at the same bias point, and impedance measurements during oscillation are not at all practical. The oscillator may be designed by using scattering parameters of the transistor, measured with the transistor not oscillating, according to the teaching, for example, of the article entitled, "Scattering Parameters Speed Design of High Frequency Transistor Circuits," by F. Weinert appearing in Electronics, vol. 39, Sept. 5, 1966. Even when this design technique is used, a certain amount of trial and error is involved in matching the transistor to the line section; an acceptable procedure is to select the transistor according to frequency and power output requirements and choose a line dimensioned to give a characteristic impedance of about 70 to 80 ohms.

In accordance with the present invention, tuning of the oscillator is accomplished by connecting at least one, and preferably two, diodes having characteristics as described above across the transmission line near a voltage minimum. The position is located by adjusting the oscillator (without the diodes) for optimum operation, and locating the voltage minimum along the line by a suitable probe lightly coupled to the line and a detector. A diode is placed near a voltage minimum, of the order of 0.1 inch from it, preferably on the transistor side of the minimum. For reasons which will be explained hereinafter, it is preferable to use two diodes, both of which may be placed near the same null point, or with one placed near one minimum and the other placed near another minimum displaced a half wavelength from the first. When both diodes are located near the same null point, they should be on the same side of the natural null to eliminate local circulating currents, but on the opposite sides of the inner conductor to minimize any possible shielding effects. When placed at different nulls, the diodes may be placed at the same or opposite sides of the null and preferably, although not necessarily, are mounted on opposite sides of the inner conductor. In the schematic diagram of FIG. 8, two diodes 50 and 52 are placed across the line near the same null point, and extend in radially opposite directions from the inner conductor 20. In FIG. 9, these corresponding diodes (designated 50' and 52' because of a different placement than shown in FIG. 8) are positioned near different null points—diode 50' near the minimum occurring about ¾ of a wavelength from the transistor 28 and diode 52' at a point displaced from diode 50' by an additional half wavelength. Diodes 50' and 52' are connected to opposite sides of the inner conductor, one terminal of each being soldered thereto, and the other terminal of each is connected to .001 microfarad feedthrough capacitors 54 and 56, respectively. In order to accommodate the diodes in the space available between the inner and outer conductors of the transmission line, they are mounted at an angle with respect to the inner conductor 20 rather than normal to the inner conductor as diagrammatically indicated in FIG. 8. It has been determined that this skewed position of the diodes has no adverse effect on the operation of the oscillator. As shown in FIG. 8, the diodes are connected with opposite polarities.

The diodes 50 and 52 are respectively D.C. biased by batteries 58 and 60 through respective 100-ohm current limiting resistors 62 and 64. It will be noted that the negative terminal of battery 58 is grounded to the outer conductor 22 of the transmission line and that the positive terminal of battery 60 is grounded. The bias of the two diodes is separately adjustable by potentiometers 66 and 68 connected across batteries 58 and 60, respectively. Resistors 62 and 64 also isolate the batteries to prevent them from shunting the diodes, allowing the modulating signal to be applied through blocking capacitors 70 and 72, each of which may have a value of 500 microfarads.

Since the diodes are connected with opposite polarities, modulation must be applied in push-pull. Due to the voltage sensitivity of the diode conductance, very low drive levels are required, which can be accomplished with simple circuitry. To accomplish push-pull drive, the modulation source is connected via a 124-ohm balanced line (not shown) to the terminals 74 and 76 of a pair of potentiometers 78 and 80 ganged out of phase, with the movable taps respectively connected to capacitors 70 and 72. The balanced potentiometer compensates for any inequality in the modulation sensitivities of the two diodes resulting from unmatched diodes, or from residual inaccuracies due to their placement on the transmission line.

Figure 11:
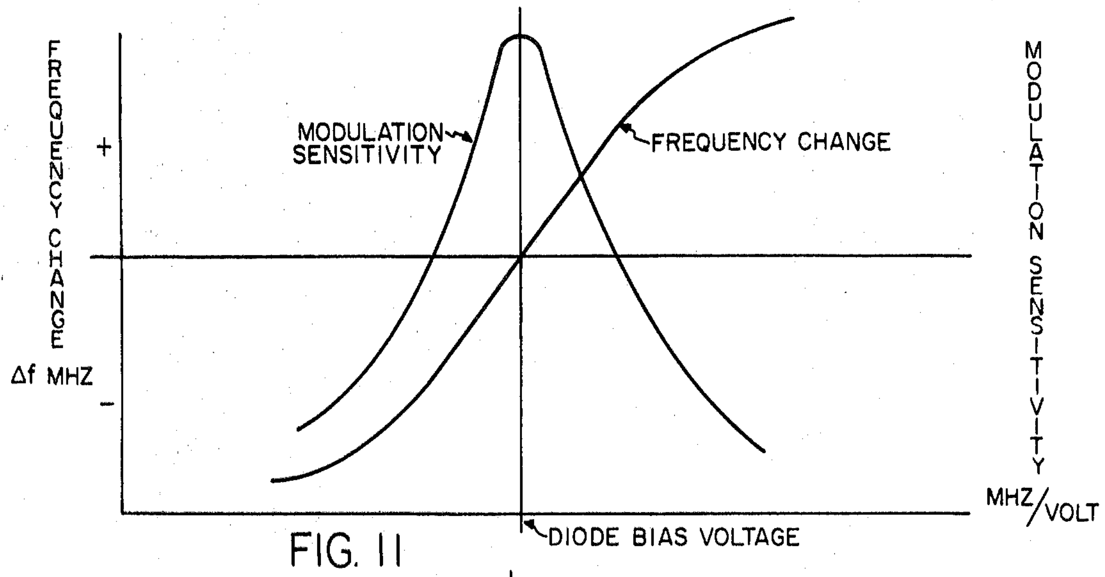
FIGS. 11, 12 and 13 are curves showing the modulation sensitivity of variously biased diodes.
Figure 12:
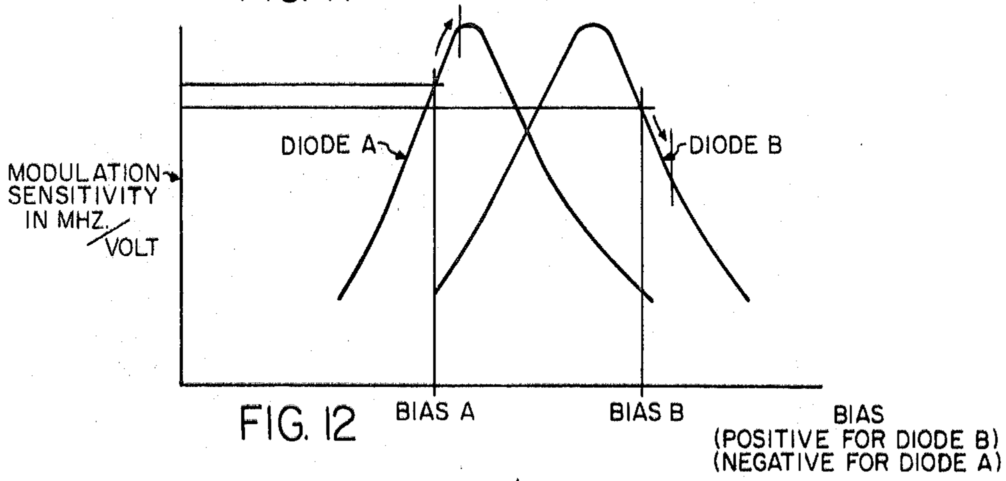
Figure 13:
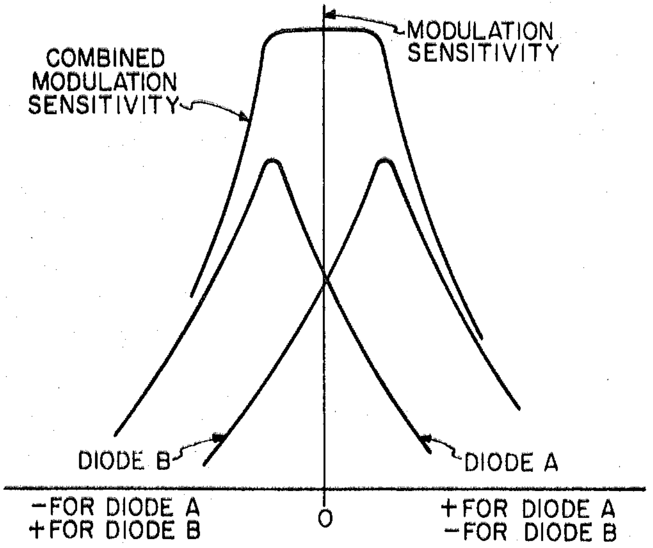

A better understanding of how the diodes effect modulation of the microwave energy, and the advantage of using two diodes instead of one, will be evident from the curves of FIGS. 11, 12 and 13. FIG. 11 is a tuning curve of incremental frequency change about the tuning inflection point for the circuit of FIG. 8 but using only one diode. The slope of the frequency change curve gives the modulation sensitivity in megacycles per volt. It has been observed that a swing of only 0.2 volt on a PIN diode will give a frequency change of 20 mc.; i.e., a modulation sensitivity of 200 mc. per volt. Because of this inherently high modulation sensitivity, with proper biasing a single diode gives good modulation linearity for reasonable deviations; however, a significant improvement results through the use of a second diode, placed either at the same null as the first or removed therefrom by an integral number of half wavelengths.

With two diodes, modulated in push-pull, the modulation linearity possible with one diode can be achieved with a lower A.C. voltage swing, thereby improving the modulation capabilities. If, in addition, each diode is biased slightly off its tuning inflection point, the linearity is further improved. This is seen in FIG. 12 which illustrates modulation sensitivity curves for two diodes connected in opposite polarities and differently biased. If diode A is biased at bias point A and diode B at bias point B, the combined modulation sensitivity of the oscillators, with the diodes driven in push-pull, will be the sum of the two individual sensitivities. If the instantaneous modulating voltage is increasing, the total bias for diode A becomes more negative, driving the diode up to a higher modulation sensitivity as shown by the arrow on the curve for diode A. At the same time diode B also experiences an increase in instantaneous modulation voltage, its total bias becoming more positive, but because of its bias point, its modulation sensitivity is dropping as indicated by the arrow. By proper adjustment of the bias, these two effects cancel, giving a constant modulation sensitivity and excellent linearity; the combined sensitivity curve is shown in FIG. 13 as a function of A.C. modulating signal swing.

Figure 3:
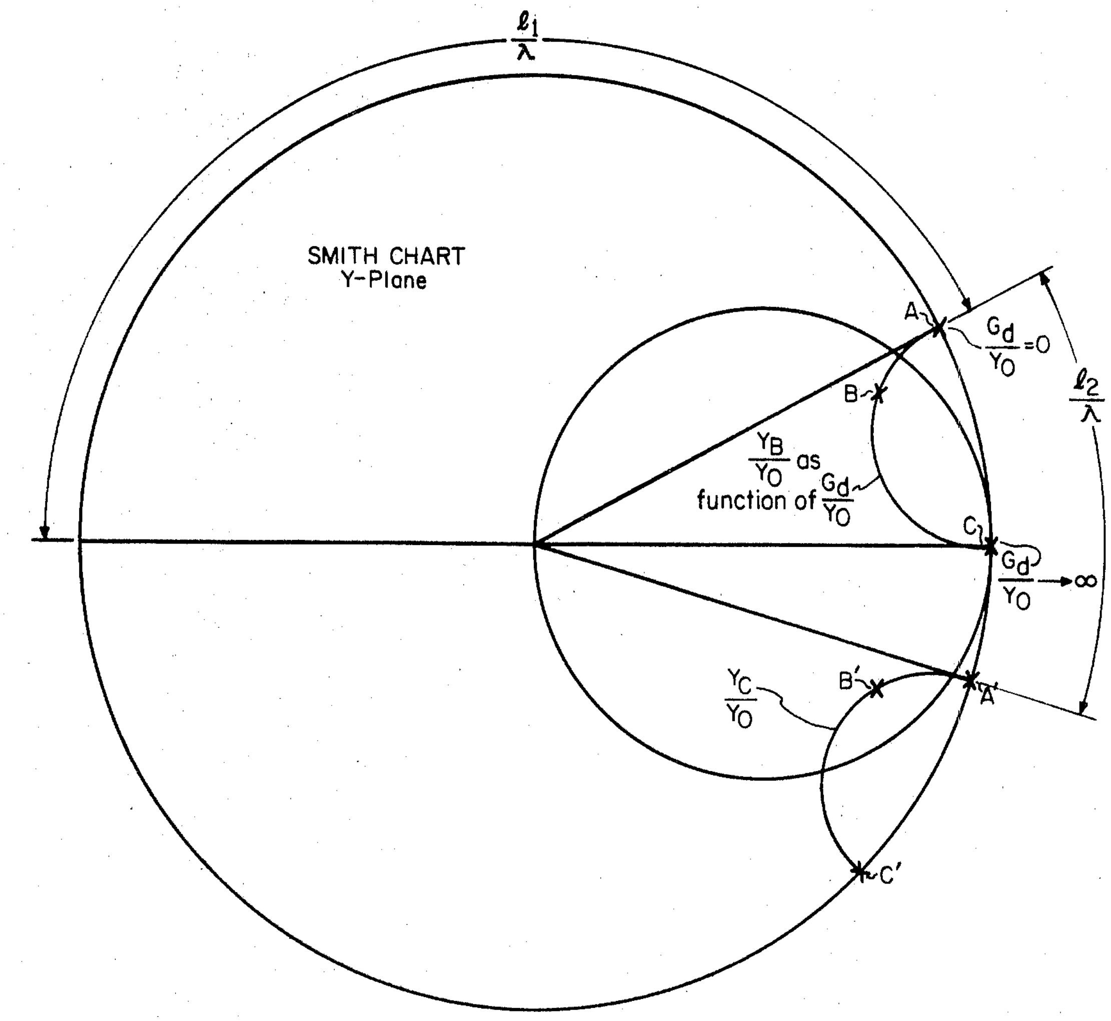
FIG. 3 is a sketch of a Smith Chart in the admittance plane.
Figure 4:
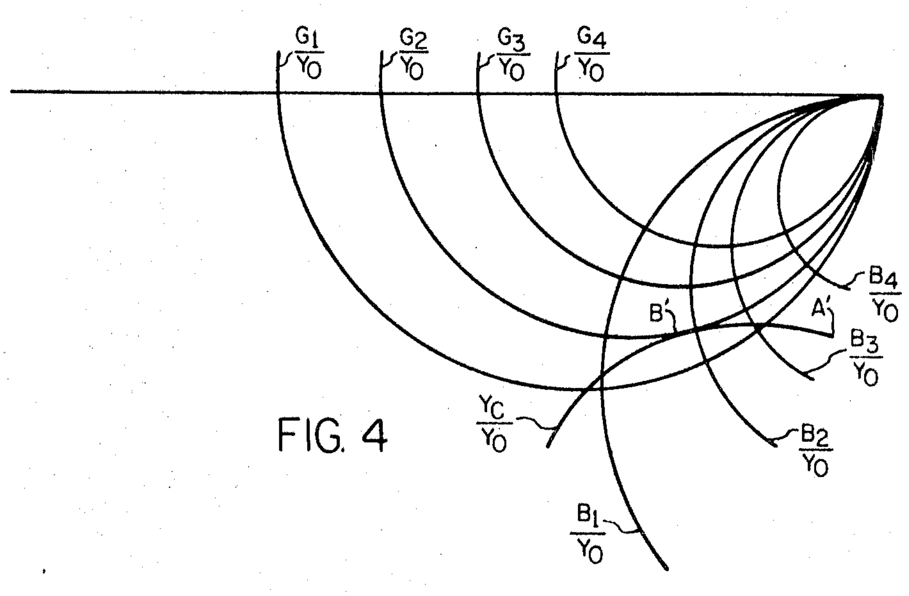
FIG. 4 is an enlargement of a portion of the Smith Chart shown in FIG. 3.
Figure 14:
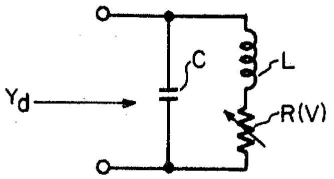
FIG. 14 is the equivalent circuit of a PIN diode.
Figure 15:
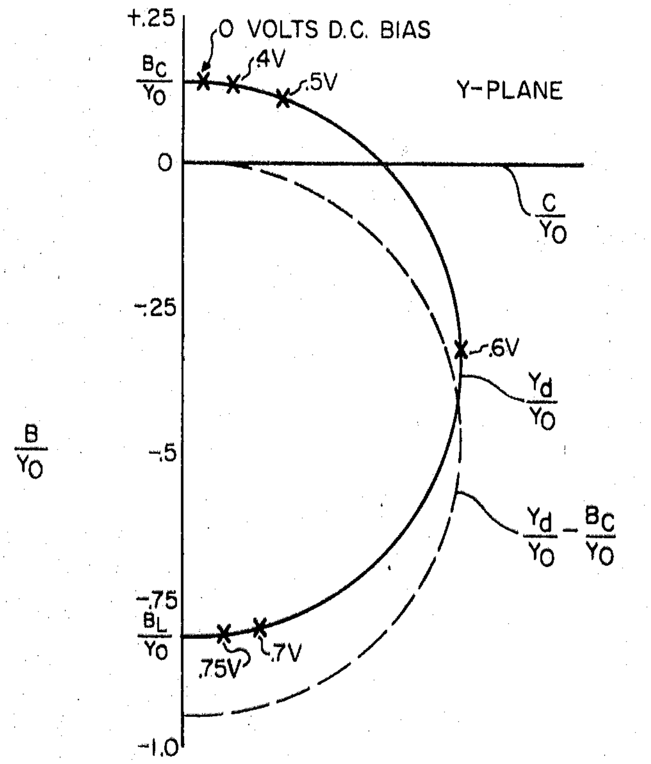
FIG. 15 is a sketch of a portion of a Smith Chart in the admittance plane showing the susceptance of a PIN diode.

Turning now to a discussion of the choice of diodes for practicably implementing the invention, the foregoing analysis has assumed that the PIN diode is a pure conductance which would give the performance shown on the Smith Charts of FIGS. 3 and 4. However, experimentation with available diodes has yielded results grossly different from those predictable from the Smith Charts. For example, instead of a predicted frequency change of 400 megacycles in an oscillator designed to operate a about 2000 megacycles, a frequency change of only about 20 megacycles was attainable. The reason is the parasitic reactances of the diode. A good PIN diode, even in a small "pill" package, has the equivalent circuit shown in FIG. 14, in which the L and C are package reactances and R(V) is the varying junction resistance. FIG. 15 is a portion of an admittance plot in the Y plane showing the measured susceptance of a diode in a glass package 0.150 inch long by 0.075 inch in diameter (an HP 5082–3001 PIN diode) at two gigacycles and normalized to the 50-ohm line in which it was measured. The inductive and capacitive susceptances are shown from which L and C (FIG. 14) can be calculated. The inductance of the package limited the maximum available value of $G_d$. With low inductance diodes, placing them in an inductive region of the transmission line selection will tune out $B_C$ and give performance somewhere near that predicted for a pure conductance. Whereas the normalized $B_L$ for this glass package diode is about −.95, the value for a "pill" package is about −3.0. In either case, with the actual admittance arc used in a Smith Chart analysis, predicted oscillator frequency is about twice that actually measured.

Although any diode exhibits the required drop in efficiency with increasing frequency, of those tested only the PIN and snap (or step-recovery) diodes show promise. Unfortunately, however, PIN and snap diodes were not designed for this application with the consequence that their minority carrier lifetimes are too long; for PIN diodes it is approximately 100 nanoseconds, and available snap diodes have minority carrier lifetimes of 8, 20, 30 and 50 nanoseconds. In any event, the optimum parameters having been established as outlined hereinabove, semiconductor diodes can now be designed and manufactured which would improve the performance realized with available devices.

Returning again to FIG. 8, the coaxial line 42 connected to the collector of transistor 28 is provided with a bias insertion unit 82, such as the commercially available General Radio Model 874–FBL, which includes a source 82*a* of bias potential, the positive terminal of which is connected to the collector electrode. The bias insertion unit is followed by a triple stub tuner 84 which shunts a susceptance across line 42 of proper value and at the proper place to match transistor 28 to the 50-ohm output line 42. The output energy from the oscillator is taken from the output port 86 of a circulator 88.

Although the tuned circuit in the oscillator of FIGS. 8 and 9 is in the base-emitter circuit of the transistor, largely because of the geometry of the TRW 2N4976, it is possible with suitable modification of the bias and drive circuitry, to locate the tuned circuit in either the emitter, base or collector circuit. In general, however, it is somewhat contradictory to connect the frequency determining circuit in the collector circuit, which usually forms the output circuit, since the output loading contradicts the requirements of the tuned circuit. This is particularly true for the high quality microwave transistors, such as the TRW 2N496 and the RCA TA7003, which have low internal feedback between collector and base. In any case, the use of PIN or snap diodes as modulating devices is equally applicable to either of the possible connections of the transmission line to the transistor; thus, all of the indicated configurations are within the purview of the invention.

Figures 16, 16A, 17, 17A:
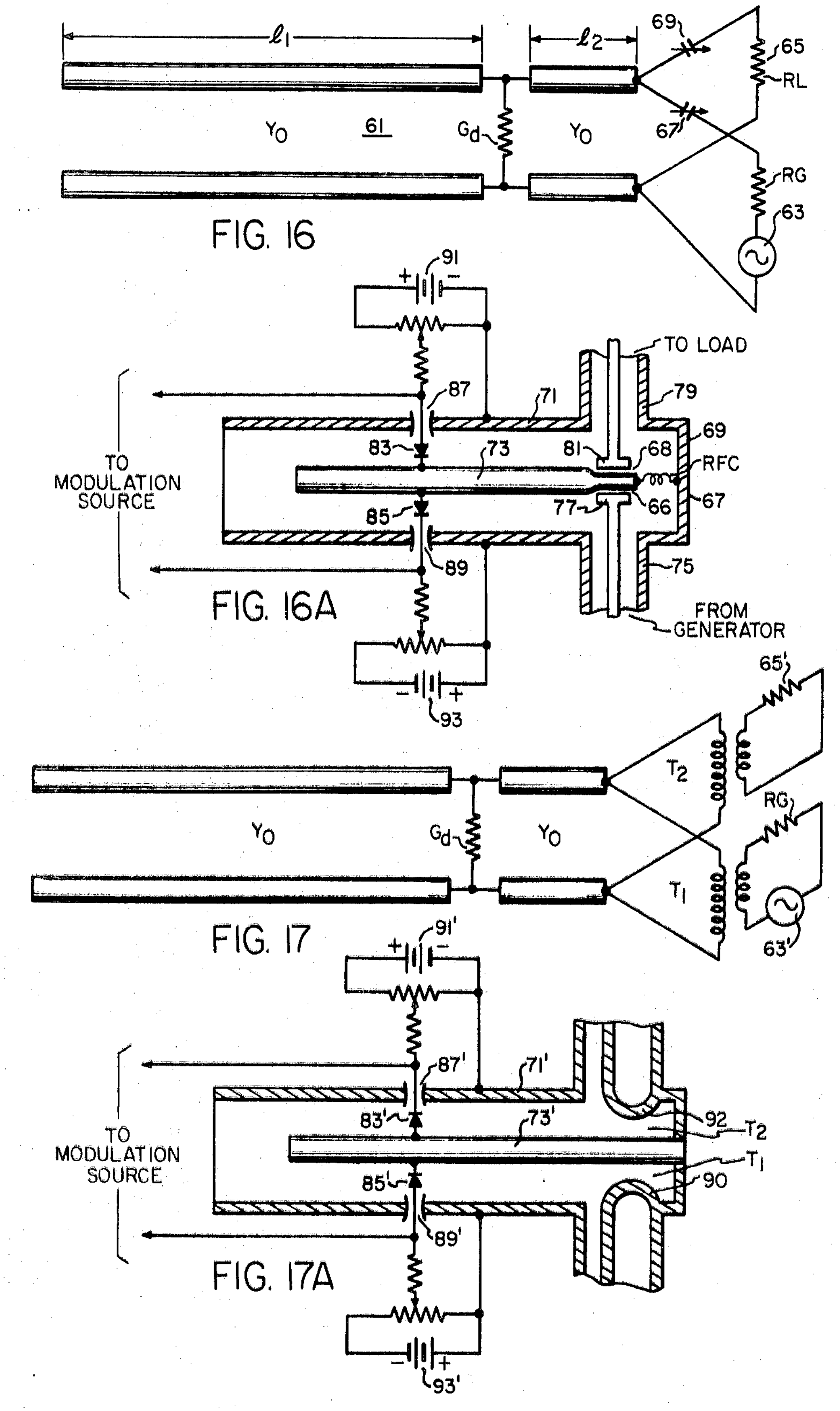
FIG. 16 is a schematic diagram of a voltage tunable filter embodying the invention.
FIG. 16A is a cross-sectional view of a coaxial transmission line embodiment of the filter of FIG. 16.
FIG. 17 is a schematic diagram of a transformer coupled voltage tunable filter embodying the invention.
FIG. 17A is a cross-sectional view of a coaxial transmission line embodiment of the filter of FIG. 17.

In addition to having utility in the disclosed oscillator, the invention can also be used to tune filters, representative examples of which are illustrated in FIGS. 16 through 17A. FIG. 16 is a schematic diagram of a capacitively coupled single-tuned filter including a section of transmission line 61 (shown in the stylized manner of FIG. 2) to which a source 63 and a load 65 are coupled by capacitors 67 and 69, respectively. These capacitors, which preferably are variable, are used to impedance match from the generator to the load, and varying the value of $G_d$ (in the manner fully discussed above) tunes the passband of the filter.

FIG. 16A is a partial cross-section view of a coaxial line implementation of the filter of FIG. 16, including a section of open-circuited transmission line having an outer conductor 71 and an inner conductor 73. The energy source is coupled to one end of the inner conductor 73 via a coaxial line 75, the inner conductor of which is formed with a platelike terminus 77 for capacitively coupling the line to the end of inner conductor of the line section. The output from the filter is coupled to the load by a second coaxial transmission line 79, the inner conductor of which is also capacitively coupled to the inner conductor 73 by its flat terminus 81. Inner conductor 73 is flattened in the area of confrontation with plates 77 and 81 to better control the values of the capacitances 67 and 69 between the plates and the inner conductor.

The structure thus far described constitutes a frequency determining circuit, the frequency of which is tuned by changing the conductance of a pair of diodes 83 and 85, having properties described earlier, connected across the line near a voltage null. The diodes are connected to the inner conductor 73 with opposite polarity, and are connected through respective feedthrough capacitors 87 and 89 to bias sources 91, and 93, respectively. If desired, the diodes may also be connected to a source of modulation signal in the manner illustrated in FIG. 8. Varying the bias (or modulating signal) on the diodes, changes the conductance of the diodes and consequently the reactances of the transmission line, to thereby tune the passband of the filter. If extreme linearity is not required, satisfactory tuning may be obtained with a single diode.

FIGS. 17 and 17A are schematic and cross-section views, respectively, of a transformer coupled equivalent of the filter of FIG. 16, and as such, only the features which are different will be described. In this case, the source 63′ and load 65′ are transformer coupled to the transmission line section by transformers $T_1$ and $T_2$, respectively. As shown in FIG. 17A, the inner conductor 73′ of the transmission line section is connected at one end to the outer conductor 71′ by way of the end wall, and energy is coupled to and from the cavity by inductive loops 90 and 92 at the inner end of the input and output coaxial lines. The diodes 83′ and 85′ are connected and biased in the manner shown in FIG. 16A, and the operation is the same.

From the foregoing it is seen that applicant has provided a frequency determining line whose frequency is tuned or modulated by one or more diodes connected across the transmission line near a voltage null and driven by a low level signal provided by relatively simple biasing and modulation circuitry. Although diodes now available do not have optimum characteristics for the disclosed purpose, it has nonetheless been possible to achieve relatively linear tuning over a range of about 20 megacycles at an operating frequency of about 2000 megacycles.

Although the oscillator and filters have been described as having an open-circuited transmission line, the principles of the invention are also applicable in a short-circuited line. However, it has been found more difficult to tune to a desired frequency when a short-circuited line is used, and that if the diodes are mounted at a null close to the short circuiting end wall, there is excessive circulation of radio frequency energy through the diodes and back along the wall which causes excess loading of the tuned circuit and poor oscillator performance. Also, although the invention has been described in connection with a coaxial transmission line, it may be applied to distributed constant lines of almost any configuration, such as strip transmission line. It is also contemplated that in addition to use in oscillators and filters, the invention can be used in almost any circuit in which a distributed constant line, used as a reactive element, is required to be tuned electrically.

What is claimed is:

1. In combination, a distributed constant frequency determining transmission line operative when energized to produce a standing wave pattern thereon of voltage maximums and nulls, means for varying the reactance of said line comprising electrically variable conductance means connected across said line at a point near a voltage null, said variable conductance means including at least one semiconductor device which exhibits the rectifier characteristic of a diode at frequencies below a predetermined threshold frequency and functions as a resistance at frequencies above said threshold frequency, and means for applying to said semiconductor device a modulating alternating current signal having a frequency below said threshold frequency.

2. Apparatus in accordance with claim 1 wherein a pair of semiconductor devices are connected across said line, wherein there are provided circuit means for oppositely biased said device, and wherein said applying means apply said modulating alternating current signal to said devices in push-pull relationship.

3. Apparatus in accordance with claim 2 wherein said devices are PIN diodes.

4. Apparatus in accordance with claim 2 wherein said transmission line is dimensioned to sustain oscillations at a frequency above said threshold frequency and wherein said semiconductor devices are connected with opposite polarities.

5. Apparatus in accordance with claim 4 further including a transitor having first, second and third electrodes, two of which are connected to respective conductors of said transmission line, said transitor when energized coacting with said transmission line to produce oscillations at a frequency above said threshold frequency, and means connected to the third electrode of said transsistor for deriving a modulated output signal.

6. Apparatus in accordance with claim 4 further including means for connecting to said transmission line a source of oscillations of a frequency above said threshold frequency, and means connected to said transmission line for coupling energy therefrom to a load.

7. An oscillator comprising, in combination, a section of transmission line having inner and outer conductors, a transistor having first, second and third electrodes mounted within said outer conductor with a first electrode thereof electrically connected to said inner conductor, first and second sources of potential respectively connected to the second and third electrodes of said transistor, said transistor when energized being operative to produce oscillations at a frequency determined by the parameters of said transistor and said line and to produce a standing wave pattern of voltage maximums and nulls on said line, and means for varying the reactance of said line to correspondingly vary the frequency of oscillation comprising electrically variable conductance means connected across said line at a point near a voltage null.

8. Apparatus in accordance with claim 7 wherein said variable conductance means comprise a pair of semiconductor devices each operative as a diode at frequencies below the frequency of said oscillations and as a resistance at frequencies at and above the frequency of said oscillations, said devices being connected with opposite polarities to said inner conductor, and further including means for applying biasing voltages and modulating signals to said devices to vary the resistance of said diodes at a rate lower than the frequency of said oscillations to thereby vary the operating frequency of said oscillator.

9. Apparatus in accordance with claim 8 wherein said devices are both connected to said inner conductor at a point near the same voltage null and extend outwardly in opposite directions from said inner conductor.

10. Apparatus in accordance with claim 8 wherein one of said devices is connected to said inner conductor at a point near a first voltage null and the other of said devices is connected to said inner conductor at a point displaced from said first device in the direction away from said transistor by an integral number of half wavelengths at the frequency of operation.

11. Apparatus in accordance with claim 9 wherein said devices are oppositely biased, and said modulating signals are applied to said devices in push-pull relationship.

12. Apparatus in accordance with claim 10 wherein said devices are oppositely biased, and said modulating signals are applied to said devices in push-pull relationship.

13. A microwave oscillator comprising, in combination, a section of coaxial transmission line having inner and outer conductors, a microwave transistor having base, collector and emitter electrodes mounted within said outer conductor with the base electrode thereof connected to one end of said inner conductor, first and second sources of direct current potential respectively connected to the emitter and collector electrodes of said transistor, said transistor when energized being operative to produce oscillations at a microwave frequency determined by the parameters of said transistor and said line and to produce a standing wave pattern of voltage maximums and nulls on said line; means for electrically varying the reactance of said line to correspondingly vary the frequency of oscillation comprising a pair of semiconductor diodes connected with opposite polarities to said inner conductor at points near a voltage null on said line, said diodes exhibiting rectifier characteristics at frequencies below the operating frequency of the oscillator and behaving as a resistance at microwave frequencies at or above said frequency of oscillation, third and fourth adjustable sources of direct current potential respectively connected to and operative to oppositely bias said diodes, and circuit means connected to said diodes for applying thereto in push-pull relationship modulating signals of a frequency substantially below the operating frequency of the oscillator to vary the effective conductance of said diodes; and an output circuit connected to the collector electrode of said transistor for deriving energy from the oscillator.

14. Apparatus in accordance with claim 13 wherein said diodes are connected near the same voltage null on said line.

15. Apparatus in accordance with claim 13 wherein said diodes are connected near different voltage nulls on said line separated by an integral number of half wavelengths at the frequency of operation.

16. A tunable filter comprising, in combination, a section of transmission line having inner and outer conductors and dimensioned to sustain oscillations at frequencies above a predetermined threshold frequency and to produce a standing wave pattern of voltage maximums and nulls; means for coupling from a source microwave energy at frequencies above said threshold frequency; means for electrically varying the reactance of said line to correspondingly vary its frequency passband comprising, a pair of semiconductor diodes connected with opposite polarities to said inner conductor at points near a voltage null on said line, said diodes exhibiting rectifier characteristics at frequencies below said threshold frequency and behaving as a resistance at frequencies above said threshold frequency, and circuit means including a source of direct current potential connected to and operative to oppositely bias said diodes to thereby vary the effective conductance of said diodes; and means coupled to said transmission line for deriving energy therefrom.

17. Apparatus in accordance with claim 16 wherein said diodes are connected near the same voltage null on said line.

18. Apparatus in accordance with claim 16 wherein said diodes are connected near different voltage nulls on said line separated by an integral number of half wavelengths at the frequency of said source.

References Cited

UNITED STATES PATENTS

| | | | |
|---|---|---|---|
| 2,788,446 | 4/1957 | Cerveny et al. | 332—29X |
| 3,068,422 | 12/1962 | Grabowski | 330—56X |
| 3,252,112 | 5/1966 | Hauer | 333—82(BUX) |
| 3,245,014 | 4/1966 | Plutchok et al. | 333—73(CUX) |
| 3,339,154 | 8/1967 | Veltrop | 331—101X |
| 3,371,291 | 2/1968 | Forrest et al. | 332—16X |
| 3,414,833 | 12/1968 | Tolliver | 325—445X |

ALFRED L. BRODY, Primary Examiner

U.S. Cl. X.R.

307—281, 319; 325—126, 445; 330—56; 331—101; 332—29; 333—82